United States Patent
Corbett, Jr. et al.

(10) Patent No.: US 11,415,257 B2
(45) Date of Patent: Aug. 16, 2022

(54) APPARATUS AND METHOD FOR JOINING MOLECULARLY ORIENTED PIPE

(71) Applicant: S & B Technical Products, Inc., Fort Worth, TX (US)

(72) Inventors: Bradford G. Corbett, Jr., Fort Worth, TX (US); Guido Quesada, San Ana (CR); Keith Steinbruck, Eugene, OR (US)

(73) Assignee: S & B Technical Products, Inc., Fort Worth, TX (US)

( * ) Notice: Subject to any disclaimer, the term of this patent is extended or adjusted under 35 U.S.C. 154(b) by 762 days.

(21) Appl. No.: 16/210,767

(22) Filed: Dec. 5, 2018

(65) Prior Publication Data
US 2019/0195409 A1  Jun. 27, 2019

Related U.S. Application Data

(60) Provisional application No. 62/609,479, filed on Dec. 22, 2017.

(51) Int. Cl.
  *F16L 47/22* (2006.01)
  *B29C 65/48* (2006.01)
  (Continued)

(52) U.S. Cl.
  CPC .............. *F16L 47/22* (2013.01); *B29C 65/48* (2013.01); *B29C 66/73711* (2013.01);
  (Continued)

(58) Field of Classification Search
  CPC ....... B29C 65/02; B29C 65/48; B29C 65/665; B29C 65/72; B29C 65/004; B29C 65/18;
  (Continued)

(56) References Cited

U.S. PATENT DOCUMENTS 3,382,563 A   5/1968  Barroil et al.
3,887,992 A * 6/1975  Parmann ............. B29C 66/1226
                                                      29/450
(Continued)

FOREIGN PATENT DOCUMENTS

CN   107116803 A   9/2017
EP       102919 A2 * 3/1984 ......... B29C 37/0082
(Continued)

OTHER PUBLICATIONS

PCT/US19/63925, International Search Report, dated Feb. 14, 2020, 2 pages.

*Primary Examiner* — Philip C Tucker
*Assistant Examiner* — Brian R Slawski
(74) *Attorney, Agent, or Firm* — Whitaker Chalk Swindle & Schwartz PLLC; Charles Gunter

(57) ABSTRACT

A pipe joining system and pipe joint are shown m which two sections of molecularly oriented pipe are joined using heat shrinking techniques. A first section of pipe is provided having a straight, pre-formed socket with an internal diameter and with an end opening having enough clearance to allow a mating spigot section having a given external diameter to be inserted into the socket end opening. After the spigot end is inserted to a given depth, the socket is heated sufficiently so that the internal diameter of the socket end comes into contact with the external diameter of the spigot end, the molecularly oriented pipe being in a rubbery state and exhibiting a low elastic modulus which allows the socket end to conform tightly to the spigot end external diameter without deforming the spigot end.

4 Claims, 8 Drawing Sheets

(51) Int. Cl.
  *B29C 65/00* (2006.01)
  *F16L 47/02* (2006.01)
  *F16L 47/12* (2006.01)
  *B29L 31/24* (2006.01)
  *B29L 23/00* (2006.01)
  *B29C 65/02* (2006.01)
  *B29C 65/66* (2006.01)
  *B29C 65/50* (2006.01)
  *B29C 65/72* (2006.01)

(52) U.S. Cl.
  CPC .......... *B29C 66/8264* (2013.01); *F16L 47/02* (2013.01); *F16L 47/12* (2013.01); *B29C 65/02* (2013.01); *B29C 65/483* (2013.01); *B29C 65/5057* (2013.01); *B29C 65/665* (2013.01); *B29C 65/72* (2013.01); *B29C 66/02245* (2013.01); *B29C 66/1122* (2013.01); *B29C 66/301* (2013.01); *B29C 66/5221* (2013.01); *B29C 66/612* (2013.01); *B29L 2023/22* (2013.01); *B29L 2031/24* (2013.01)

(58) Field of Classification Search
  CPC . B29C 65/106; B29C 65/5057; B29C 65/483; B29C 66/1122; B29C 66/30341; B29C 66/5221; B29C 66/71; B29C 66/73711; B29C 66/73921; B29C 66/8264; B29C 66/02245; B29C 66/301; B29C 66/5229; B29C 66/52296; B29C 66/612; B29L 2023/22; B29L 2031/24; F16L 47/02; F16L 47/12; F16L 47/22
  USPC ... 156/60, 91, 153, 160, 165, 196, 198, 293, 156/294, 296, 304.1, 304.2, 304.3, 156/304.55, 311, 313, 330, 331.7; 264/294, 296, 320, 322, 249; 285/423, 285/260, 374, 381.4, 381.5
  See application file for complete search history.

(56) References Cited

U.S. PATENT DOCUMENTS

| | | | |
|---|---|---|---|
| 3,920,268 A * | 11/1975 | Stewing | B29C 66/73715 285/21.1 |
| 4,047,739 A * | 9/1977 | Aitken | B29C 65/0609 285/21.1 |
| 4,141,576 A | 2/1979 | Lupke et al. | |
| 4,362,323 A | 12/1982 | Lodder et al. | |
| 4,792,374 A * | 12/1988 | Rianda | B29C 66/81811 156/503 |
| 5,662,360 A | 9/1997 | Guzowski | |
| 5,918,914 A | 7/1999 | Morris | |
| 5,928,451 A * | 7/1999 | Johansson | F16L 55/1654 156/242 |
| 6,034,002 A | 3/2000 | Maderek | |
| 6,861,026 B2 | 3/2005 | Holdstrand | |
| 7,722,093 B2 | 5/2010 | Henke | |
| 7,959,429 B2 | 6/2011 | Munoz De Juan | |
| 8,210,573 B2 | 7/2012 | Delmer | |
| 8,562,331 B2 | 10/2013 | Schramm et al. | |
| 2003/0085573 A1* | 5/2003 | Shumard | F16L 19/075 285/374 |
| 2008/0231042 A1* | 9/2008 | Brayman | B23P 11/025 285/41 |
| 2010/0154977 A1* | 6/2010 | Sasek | F16L 47/22 156/158 |
| 2011/0062700 A1 | 3/2011 | Corbett, Jr. | |
| 2013/0113208 A1 | 5/2013 | Liao et al. | |
| 2014/0252761 A1* | 9/2014 | Schroeder | F16L 33/225 285/257 |
| 2018/0094754 A1 | 4/2018 | Quesada | |
| 2019/0195409 A1 | 6/2019 | Corbett, Jr. et al. | |

FOREIGN PATENT DOCUMENTS

| | | | |
|---|---|---|---|
| GB | 695027 A | 8/1953 | |
| GB | 1323836 A | 7/1973 | |
| JP | 09144976 A * | 6/1997 | ......... B29C 66/5229 |
| WO | WO-9913256 A1 * | 3/1999 | ....... B29C 66/52297 |
| WO | 0007803 A1 | 2/2000 | |

\* cited by examiner

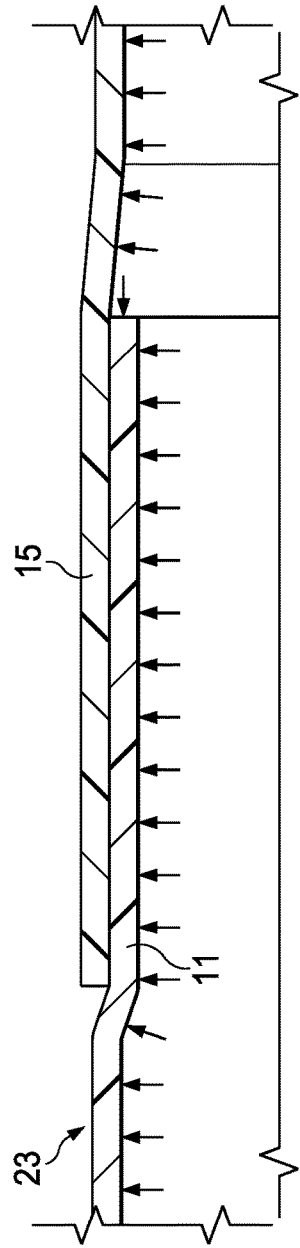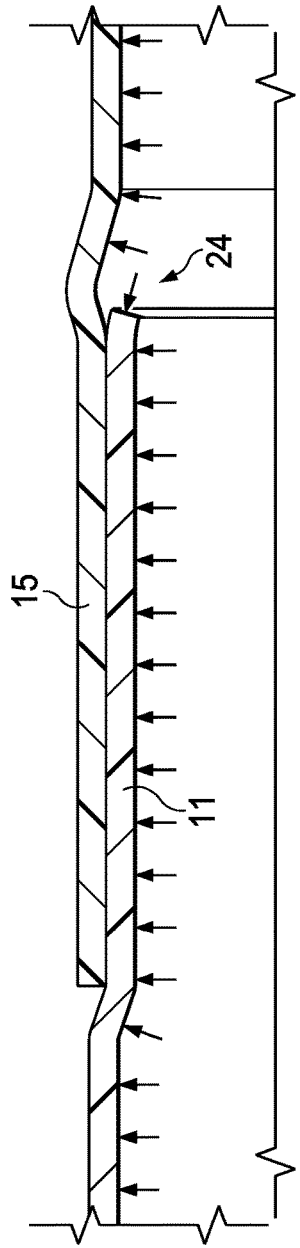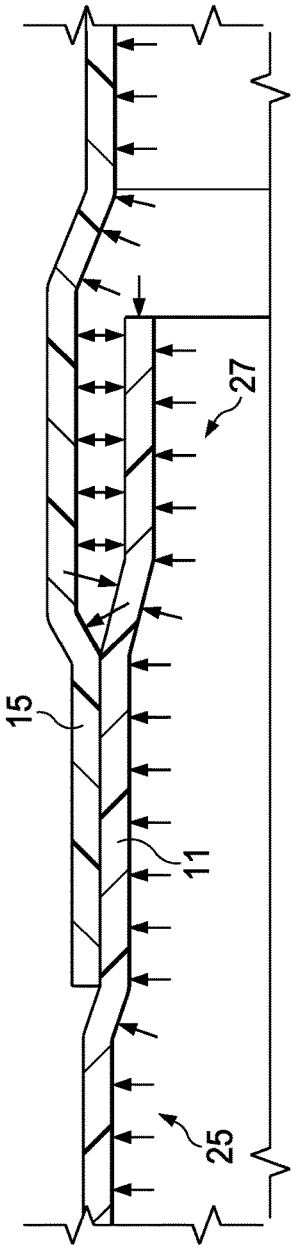

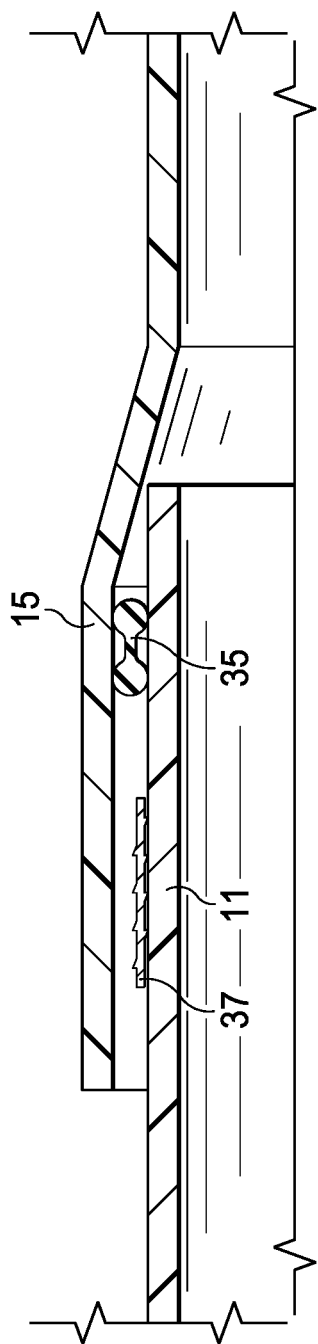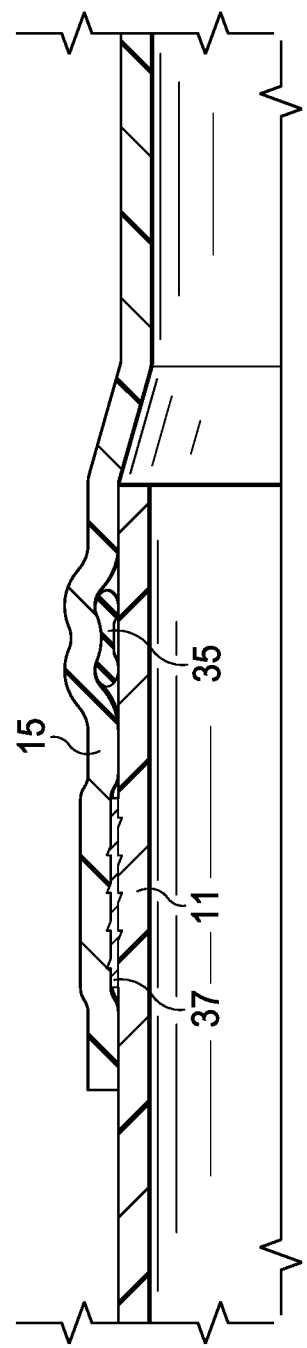

APPARATUS AND METHOD FOR JOINING MOLECULARLY ORIENTED PIPE

CROSS REFERENCE TO RELATED APPLICATIONS

This application claims priority from a previously filed provisional application, Ser. No. 62/609,479, filed Dec. 22, 2017, entitled "Apparatus and Method For Joining Molecularly Oriented Pipe", by the same inventors.

BACKGROUND OF THE INVENTION

Field of the Invention

The present invention relates generally to joining and sealing systems for pipe joints formed of molecularly oriented plastic pipe, and to a simplified method for coupling pipe sections of molecularly oriented plastic pipe using heat-shrinking technology to than such joints.

Description of the Prior Art

Pipes formed from thermoplastic materials including polyolefins such as polyethylene, polypropylene and PVC are used in a variety of industries. For example, such pipes are commonly used in municipal water and sewer applications. In forming a joint between sections of pipe, the spigot or male pipe end is inserted within the female or socket pipe end. The actual manufacture of the mating sections of plastic pipe typically involves the reforming of the end of the pipe by reheating and shaping to some desired profile to provide a means diming with the opposing end of the next pipe. The art of forming sockets (also called bells) on plastics pipes is well established, and there are numerous processes and methods in the literature. An annular, elastomeric ring or gasket is typically seated within a grove or "raceway" formed in the socket end of the thermoplastic pipe to assist in forming a sealed pipe joint between adjoining sections of pipe. As the spigot is inserted within the socket, the gasket provides the major seal capacity for the joint.

In recent years, pipe systems employing the so called "PVC-O" pipe have become increasingly popular. The designation "PVC-O" stands tar polyvinylchloride oriented, sometimes referred to simply as molecularly oriented pipe, or "MOP." It is well established in the literature that molecular orientation of plastics can provide enhanced mechanical properties for plastic pipe of the type under consideration, and such materials are commonly used for plastics pipes. The molecularly oriented thermoplastic materials enhance the strength of the article in certain directions by orienting the molecules in the plastic material in such directions.

Orientation is achieved by drawing or stretching the material under appropriate conditions of temperature, such that a strain (i.e. deviation from the originally formed dimensions) is induced in the plastics material to cause alignment of the molecules, and thereafter cooling the material while drawn to lock in that strain. A number of methods have been proposed whereby this principle is applied to plastic pipes, in particular in order to enhance their strength under internal pressure by circumferential and/or axial forces, or by external forces acting on the pipeline.

For example, U.S. Pat. No. 4,428,900, shows a pipe of oriented thermoplastic polymeric material having an integral socket which is manufactured by expanding a tubular blank. The tubular blank is heated by circulation of bot water to a temperature at which deformation will induce orientation of the polymer molecules. The blank is then expanded radially outward against a mold by application of internal pressure.

U.S. Pat. No. 5,449,487, shows an apparatus and method for orienting plastic pipe. A heated pipe is oriented radially by means of a conically widening mandrel which is located downstream of the plastic extruder.

The above examples are intended merely to be illustrative of the general state of the art in the manufacture of molecularly oriented pipe.

Whether the pipeline system in question is the more ordinary PVC pipeline, or the more exotic PVC-O pipeline, it is often desirable to provide a "restrained joint" to insure that the spigot or male pipe end and the female or socket end do not separate due to internal or external forces, such as hydraulic forces that exist inside the pipeline, or external forces, such as bends in the direction of the pipeline, earthquakes or ground movement, and the like.

The problem is exacerbated in the case of PVC-O pipe joints in that the prevalent socket end is often provided with an "Anger Raceway" for receiving the sealing gasket. Since an advantage of PVC-O pipe is that it can be thinner with the same type strength as traditional PVC pipe, the Anger Raceway has a different geometry than the traditional socketed grooves provided in the more traditional "Richer" gasket sealing systems for traditional PVC pipe. This geometry has proved to be more difficult problem from the standpoint of providing a securely sealed joint than the traditional PVC pipe joint.

One approach to joining molecularly oriented pipe with a "restrained joint" was presented in U.S. Patent Publication No. 2011/0062700 to Corbett, Jr., assigned to the assignee of the present invention. That publication disclosed a method for joining molecularly oriented pipe in which a coupling is provided which is formed of a material other than molecularly oriented pipe, such as ordinary PVC pipe. The coupling is formed as a tubular body with a combination sealing, and restraint mechanism located in each of two opposing end openings of the coupling that seal and restrain mating plain spigot ends of the molecularly oriented pipe. Because the coupling is made of a material such as ordinary PVC, the sealing and restraint mechanisms can be installed in internal grooves provided in the coupling interior during normal pipe belting operations without introducing unacceptable levels of stress or strain into the product. While providing a workable solution, that approach had the disadvantage of requiring more coupling components, adding to the cost of each joint in the pipeline system.

There are presently no other commercially available solutions to the above problem known to Applicant. The existing solutions have a limited pressure range and typically rely on indentation of the PVC-O pipe which is typically hard and relatively brittle.

A need continues to exist therefore, for improved techniques for manufacturing and joining molecularly oriented pipe and specifically PVC-O pipe, which techniques take into account the unique properties of these types of molecularly oriented plastic materials.

SUMMARY OF THE INVENTION

A method is shown for joining a first longitudinal section of molecularly oriented pipe to a second longitudinal section of molecularly oriented pipe. Each of the longitudinal sections of molecularly oriented pipe has at least one plain, spigot end having a given external diameter and a mating, oppositely arranged socket end having a given internal diameter. In the first step in the method, a first section of pipe is provided having a straight, pre-formed socket with an internal diameter and with an end opening having enough clearance to allow a mating spigot section end having a given external diameter to be inserted into the socket end opening and be closely received therein. After inserting the spigot end to a preselected depth in the mating socket end, the socket end is heated so that the internal diameter of the socket end comes into contact with the external diameter of the spigot end. The molecularly oriented pipe at this point is in a rubbery state and exhibits a low elastic modulus due to the heating, which allows the socket end to conform tightly to the spigot end external diameter without deforming the spigot end. The socket end is then cooled sufficiently to cause the socket end to undergo thermal contraction to produce an interference fit with the spigot end.

In one preferred method of carrying out the process of the invention, a pipe joint of molecularly oriented pipe is formed by solely relying upon the pre-existing shrinking capabilities that are inherent in these particular types of plastics. In another aspect of the method of the invention, a gasket is provided between the internal diameter of the socket end and the external diameter of the spigot end to increase the sealing capacity of the joint.

In another aspect of the method of the invention, the spigot and socket form a restrained joint by increasing the coefficient of friction of the external diameter of the spigot end. The coefficient of friction of the spigot end can be increased, for example, by a technique selected from the group consisting of forming bumps in the external diameter of the spigot end and machining ridges, providing knurled surfaces and providing sanded surfaces on the spigot end.

The spigot end and socket end may also form a restrained joint by providing a mechanical gripping element between the spigot end outer diameter and the socket end internal diameter. The mechanical gripping element can be, for example, a metallic and rubber sleeve composite. The mechanical gripping element might also be a simple wire mesh sleeve.

The spigot end and socket end may also form a restrained joint by applying an adhesive between the internal diameter of the socket and the external diameter of the spigot. The adhesive might be, for example, an adhesive selected from the group consisting of epoxy adhesives, polyurethane adhesives and heat activated adhesives. The adhesive might also be provided in the form of a double sided stick tape.

Preferably, in the inventive method for joining a first longitudinal section of molecularly oriented pipe to a second longitudinal section of molecularly oriented pipe, the heat shrinking step includes a heat shrinking technology selected from the group consisting of an open flame, an oven, a pressure chamber over a selected area of the pipe joint being formed and a plug run inside a selected area of the joint being formed.

An improved point joint is also shown which uses the previously described method steps to join two sections of molecularly oriented pipe and will be thither described in the detailed description which follows.

Additional objects, features and advantages will be apparent in the written description which follows.

BRIEF DESCRIPTION OF THE DRAWINGS

FIGS. 6-9 are simplified, partly schematic views of the pipe joint of FIG. 3, but showing several possible failure mechanisms that must be taken into account when the pipe joint is subjected to pressure.

FIGS. 19-20 are quarter sectional views of the pipe joint of the invention showing the use of a mechanical gripping element, along with a rubber gasket to insure the integrity of the pipe joint.

DETAILED DESCRIPTION OF THE INVENTION

Figure 1:
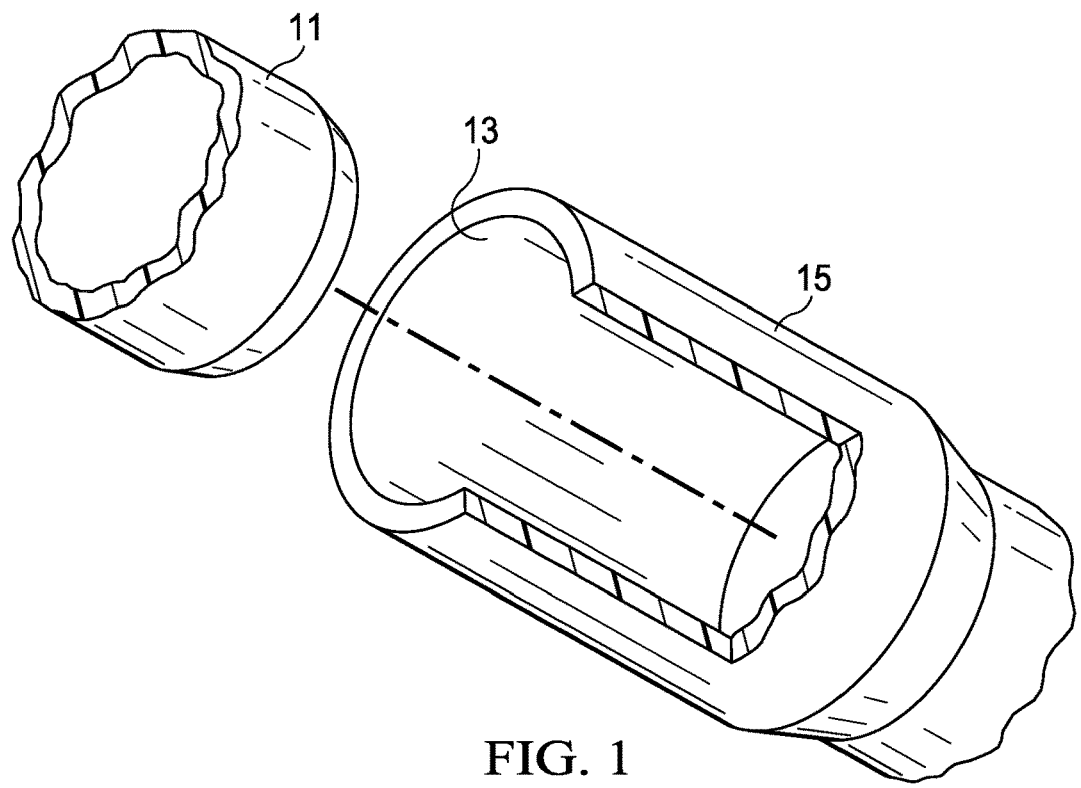
FIG. 1 is an end view of a socket section of molecularly oriented plastic pipe, partly broken away, and showing the socket end opening into which a mating spigot pipe end is about to be inserted.

As briefly discussed in the Background portion of the present application, plastic pressure pipe systems are used fir the conveyance of drinking water, waste water, chemicals, heating and cooling fluids, foodstuffs, ultrapure liquids, slurries, gases, compressed air and vacuum system applications, both for above and below ground applications. Plastic pressure pipe systems have been in use in the United States for potable (drinking) water systems since at least about the 1950s, The types of plastic pipe in commercial use in the world today include, for example, unplasticized polyvinyl chloride (referred to as PVC or PVC-U), acrylonitrile butadiene styrene (ABS), post chlorinated polyvinyl chloride, (CPVC), polypropylene (PP), polyethylene (PE), polyvinylidene fluoride (PVDF) and polybutylene (PB) and more recently the molecularly oriented plastics.

As discussed in the Background section above, the net form of plastic material used in plastic pipe manufacture is the so called "PVC Molecularly Oriented Pipe", sometimes called "PVC-O pipe" or simply "MOP" for simplicity. As has been briefly explained, these molecularly oriented thermoplastic materials often exhibit enhanced strength of the article in certain directions by orienting the molecules in the plastic material in such direction, whereby the tensile strength of the plastic increases and the stretch decreases in such direction. This can provide advantages, for example when applied to tubular articles, where orienting is effected in the radial direction, for instance to increase the pressure resistance of the pipe, or in the longitudinal direction of the pipe, for instance to increase the tensile strength of the pipe, or in both directions (biaxial orientation). In the case of PVC-O pipe systems for municipal water and sewer pipe, the molecular orientation approximately doubles the material strength, so that only about half the wall thickness for the same pipe class is required to be used to meet the applicable specifications.

A disadvantage of the molecularly oriented pipe (MOP), however, when used in such processes as the well known "Rieber" belling process is that the MOP is more difficult to bell. During the Rieber belling operation, a heated pipe end is forced over a forming mandrel which typically has a sealing ring, and perhaps other components, mounted about the mandrel. It is necessary to deform the heated pipe end as it passes over the forming mandrel and accommodates the sealing ring or other components. In some cases, the material of the MOP is already stretched to near its limit dining pipe manufacture. The belling operation may fail when such MOP feedstock is used in a Rieber belling process, or at the very least, the otherwise desired properties of the MOP may be altered.

S&B Technical Products, Inc./Hultec, the assignee of the present invention, has previously developed specialized sealing gasket designs for PVC-O pipe. These designs are generally referred to as the PRESSURE FIX™, in Europe, and as the MAMBO™ in North America. Although these gaskets have been shown to be effective sealing solutions for PVC-O in many instances, there continue to be instances where MOP and particularly PVC-O pipe is not able to adequately withstand the stresses encountered during pipe belling operations, or in maintaining sealing integrity at pipe joints in field applications.

The present invention offers a solution to the previously described problem with MOP by utilizing a heat shrink joining method for forming joints of PVC-O pipe. While heat shrink techniques exist in the literature and have been used with other plastic pipe systems, particularly corrugated pipe systems, they have typically employed a shrinking element which was a separate, distinct part, like a sleeve. The use of a sleeve, which by its nature did not become a structural integral part of the pipe, presented a weak point in the pipeline system. Applicant is also unaware of any previous work in joining PVC-O pipe which specifically took advantage of the pre-existing shrinking capability of PVC-O pipe which is an inherent property of the material.

The method of the invention takes advantage of the reversion and contraction properties of PVC-O pipe in a visco-elastic process. When the PVC-O material is heated to about 80° C., it reaches a "rubbery" state where it remains very resilient but with a low viscosity. A low "long-term" elastic modulus is reached very quickly due to the material's low viscosity. The process involves very little permanent (plastic) deformation.

When the PVC-O material is cooled in the expanded shape to, for example, about 55° C., it returns to a very high viscosity before it can shrink back to its original geometry The material, in effect, remains virtually "frozen" in the deformed state due to the very high viscosity. The material then undergoes thermal contraction as it further cools to ambient temperature.

The method of the invention takes advantage of a further processing step, not normally used in the manufacture of PVC-O pipe. If, after the normal manufacturing operation, the PVC-O pipe is heated again to near glassy transition, its viscosity will drop again and it will recover much of its original shape. Another way of saying this is that when PVC-O pipe is heated above its glass transition temperature it reverts; the OD shrinks, walls thicken, and some of the orientation of the molecules is lost. It will harden when cooled again, although, as explained, it may have lost some of its molecular orientation. This is why normal belling of PVC-O pipe must be done at cold temperatures yet above the glass transition. The most important point for purposes of the present invention is that the PVC-O pipe will shrink, rather than expand with the additional heating step, including the formed socket.

The two commonly used methods for manufacturing PVC-O pipe will now be briefly discussed, Both processes start by extruding a length of PVC-U pipe at a reduced diameter and increased wall thickness, followed by heating the pipe to the glassy transition temperature and expanding it to the desired diameter and wall thickness.

The following is an example of a "hatch process" for producing PVC-O pipe:

Extrude a pipe at 50% OD and 200% thickness of desired product. Cut into 7.1 m sections.

Insert length of starting stock into a closed mold. This mold is a jacketed cylinder approximately 7.6 meters (25 ft) long including bell-forming segment that is bolted on its end. Each end of the starting stock is "pinched down" and held in place.

Heat the pipe near its glassy transition temperature. Use internal pressure to expand the pipe until it comes in contact with the mold.

Cool the mold. After the pipe hardens again it will undergo thermal contraction so it detaches from the mold surface.

Remove expanded pie from the mold.

The pipe is transported to a cutting station where each of the "pinched down" ends is cut off to form the final 6.1 meter (20 ft) laying length.

The following is an example of a "continuous process" for producing PVC-O pipe:

Extrude a pipe, or starting stock, 50% of the desired OD and having twice the wall thickness of the desired finished product.

The starting stock goes through a "conditioning tank" where it is uniformly heated to a desired temperature.

The starting stock is pulled through an "expansion zone" by a second haul-off where further heat brings the stock above the Tg of PVC. Desired dimensions are attained in the expansion zone.

The oriented pipe is cooled in a spray tank.

The oriented pipe is cut to length using a special rotary saw.

The oriented pipe is transported to a belling machine and the bell socket is formed.

Belling and gasket options for commercially available PVC-O pipe may vary, but a common approach is to form a bell or socket end with an internal circumferential groove for receiving an annular sealing gasket, PVC-O pipe, unlike ordinary PVC-U pipe, is typically provided with what is called a "30/60" internal circumferential goose or "Anger Groove" for funning a non-restrained joint. The Anger Groove provides a very limited space for any type of joint restraint, and to Applicant's knowledge, there are presently no successful joint restraints in the marketplace for these types of pipe systems. Holding gasket raceway dimensions is difficult in PVC-O pipe, with the belling process being the greatest contributor to scrap. As the PVC-O pipe wall becomes relatively thicker, it becomes more difficult to meet specifications.

Turning now to FIG. 1, there is shown a male or spigot pipe end 11 of one section of PVC-O pipe about to be inserted into the mouth or end opening 13 of a socket or bell pipe end 15 of a second, mating section of PVC-O pipe of the type under consideration, the two sections being shown in somewhat exaggerated fashion for ease of illustration.

Figure 2:
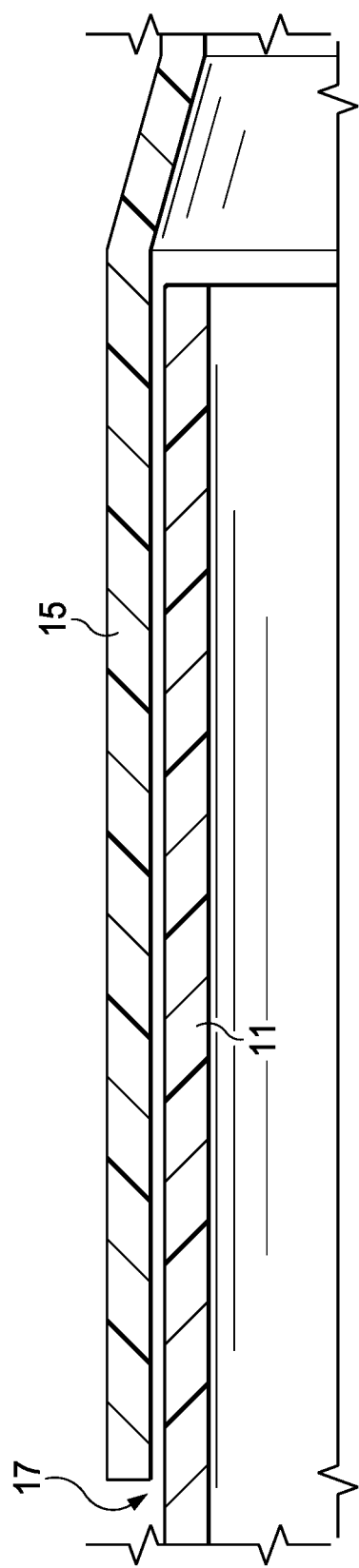
FIG. 2 is a quarter sectional views of the previously described molecularly oriented pipe socket end with the spigot end being inserted into the spigot end, but prior to any heating.
Figure 3:
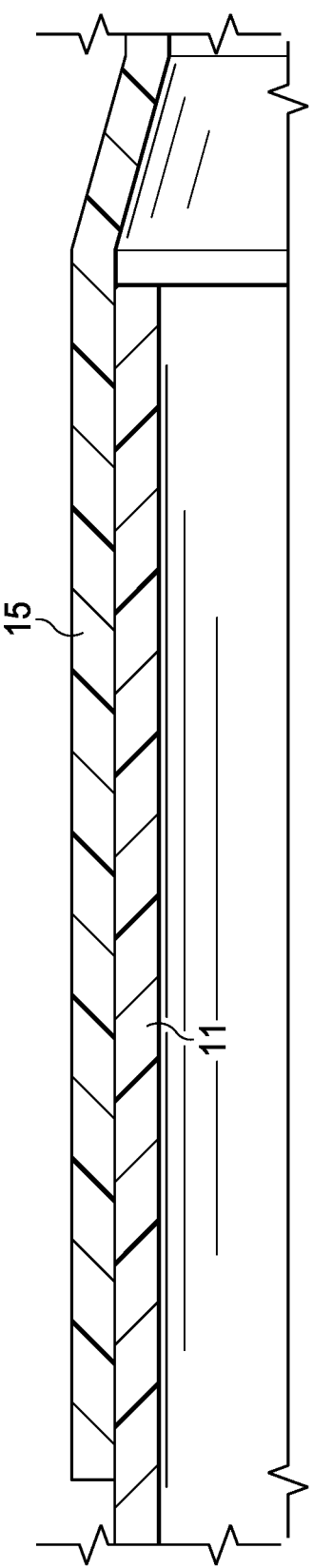
FIG. 3 is a view similar to FIG. 2, but showing the pipe socket end and spigot end after heating so that the socket end shrinks until it comes into contact with the spigot end.

The basic heat shrink, pipe joining process of the invention will now be described with respect to the quarter sectional, axis-symmetric views of FIGS. 2 and 3. In each case, the upper section 15 represents a section of the socket, while the lower section 11 represents a section of the spigot of the pipe system of FIG. 1.

The process starts from a length of PVC-O pipe with a straight, pre-formed socket 15. Note that there is enough clearance (indicated generally at 17) between the male, spigot end 11 and the socket end 15 to allow easy insertion of the spigot 11. After inserting the spigot, the socket is heated to about 80° C., causing the socket to shrink until it comes into contact with the spigot. Note that the socket is shrinking with temperature, rather than expanding. The PVC-O material is now in a rubbery state and the low elastic modulus will help the socket conform tightly to the spigot surface without deforming the spigot. The heating process can be accomplished in various ways, including the use of open flame (propane), various types of ovens (hot air, steam, resistance heaters) or by using an industrial heat blanket.

Figure 4:
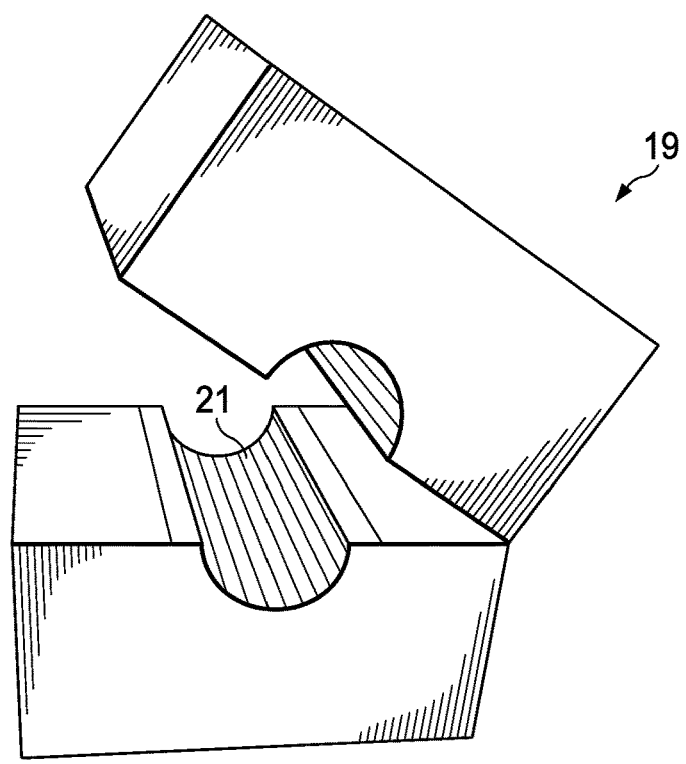
FIG. 4 is a simplified view of a commercially available clam shell style oven of the type which could be used to heat shrink the molecularly oriented pipe and form a pipe joint.
Figure 5:
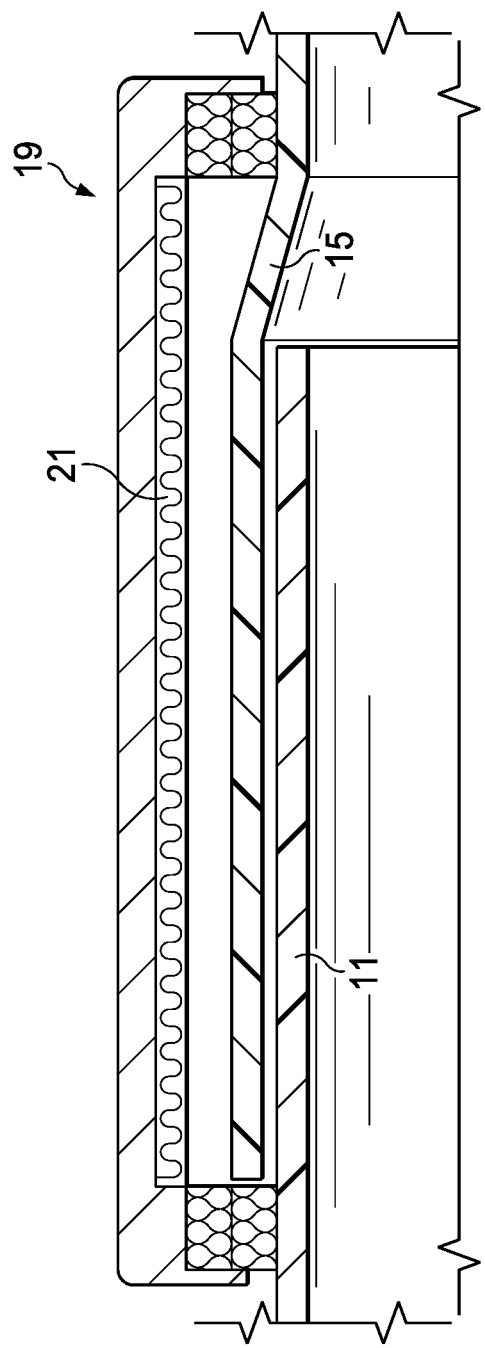
FIG. 5 is a quarter sectional view of the pipe joint of FIG. 2, just prior to beginning heating with the clam shell oven.

FIGS. 4 and 5 illustrate a clam shell type heater 19, of the type commercially available in the marketplace today, having internal resistance heating elements 21 which could be used for the heating step. In some cases, a pressure chamber might be placed over the overlapping socket area which would be heated inside and later water cooled. Optional cooling may be provided inside the pipe with a mandrel or air. A plug might also be run inside the pipes beneath the socket area. This could be, for example, a metallic cylinder which could be hollow and also provide for cold water delivery. The plug could also be of the inflatable type. Insulating and cooling elements may be provided to prevent the spigot from heating and softening at the same time as the socket. Moderate pressure, for example, 1 bar, might also be applied to accelerate shrinkage.

In the next step in the process, the socket 15 is cooled to about, for example, 55° C., causing the socket to harden. The socket will undergo thermal contraction to produce about an 0.5% interference fit with the spigot 11. This will insure that the spigot and socket remain firmly attached at the joint.

The Joint Interference Contact Pressure can be Estimated:

Using thin wall theory for simplicity and assuming the same elastic modulus for spigot and bell, the contact pressure between them is $$p_i = E \frac{\varepsilon_t}{\frac{D_n - e_n}{2e_n} + \frac{D_n + e_b}{2e_b}}$$

E elastic modulus of PVC (typically 2800 MPa)
$\varepsilon_t$ thermal shrinkage of bell (typically 0.005)
$D_n$ nominal pipe OD
$e_n$ nominal wall thickness of pipe
$e_b$ wall thickness of bell Then assuming that the wall thickness of the socket is such that SDR (Standard Dimension Ratio) is the same as the rest of the pipe a simplified expression can be written which is available for different pipe classes:

$$p_i = P_N \left(\frac{E}{\sigma_c}\right) \varepsilon_t$$

$P_N$ nominal pressure using the same units $p_i$
$\sigma_c$ design stress (12.5 MPa for pipes at and above DN 110 by ISO 4422)

From here the interface pressure is roughly the same as the nominal pressure.

The Effect of Internal Fluid Pressure Must be Taken into Account:

When and internal fluid pressure $P_f$ is applied to the pipe, it It pushes the spigot against the socket so the interface pressure increases roughly to:

$$p_{if} = p_i + \frac{p_f}{2}$$

Then for example at nominal pressure the interface pressure between spigot and socket is roughly 50% greater, which would ensure sealing.

Under pressure the pipe also expands, expressed in terms of strain:

$$\varepsilon_f = \frac{p_f}{E}\left(\frac{D_n - e_n}{2e_n}\right)$$

At the joint the effective SDR is about twice. So, expansion under fluid pressure occurs at half the rate.

Considering this, expansion of the socket next to the overlap will exceed the thermal interference at roughly $2P_N$. At this point, the interface pressure at the edge of the overlap becomes 0, fluid penetrates it, expands the socket and the joint fails.

Pressure penetration can occur at an interface pressure greater than 0. Sometime this is referred to as the "critical pressure" and it depends on the smoothness of the contact surfaces to a large extent. Failure can occur anywhere between $P_N$ and $2P_N$.

FIGS. 6-9 are intended to illustrate, in simplified fashion, the possibility of a failure mechanism under pressure. Any deformation due to heat shrink is not shown. The deformation due to pressure is shown in exaggerated fashion for illustration purposes.

Figure 6:
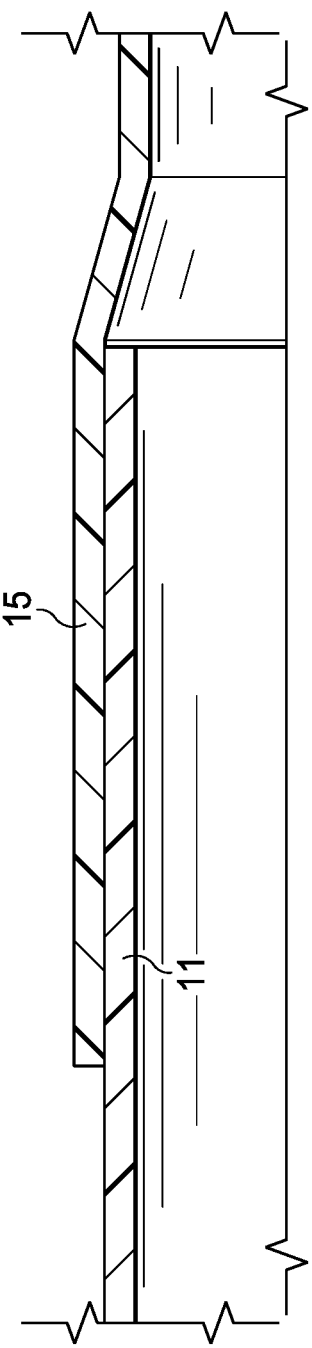

FIG. 6 shows the initial pipe condition with oust any internal pressure. In FIG. 7, as pressure is applied, the pipe length spaced away from the overlap undergoes more expansion. This is illustrated generally at 23 in FIG. 7. When the difference in expansion overcomes the shrink fit interference, a gap starts to open and fluid pressure penetrates the interface. This is illustrated in exaggerated fashion generally at 24 in FIG. 5. As pressure is exerted on both sides of the spigot (as at 25, 27 in FIG. 9), it returns to its original diameter, while the socket continues expanding.

Resistance to Axial Thrust can also be Estimated:

Equating friction force that the join can generate and axial thrust that fluid applies on the spigot:

$$F_A = \mu p_{if}(\pi D_n L) = p_f \frac{\pi D_n^2}{4}$$

$\mu$: friction coefficient, typically 0.3.

The length of socket required to resist axial thrust would be:

$$L = \left(\frac{1}{\frac{p_i}{p_f} + \frac{1}{2}}\right)\left(\frac{D_n}{4\mu}\right)_{P_N}$$

Considering $P_i \sim P_N$ $$L = \frac{D_n}{6\mu} \sim \frac{D_n}{2}$$

This would be a reasonable socket length for most applications. Also, a practical socket length for joint restraint is achievable as long as the joint doesn't fail due to socket expansion under internal pressure. Still, a more secure restraint mechanism would be desirable in some circumstances. Nevertheless, a very long overlap would ensure axial restraint where other types of restraint mechanisms are not practical or desirable.

Enhancements to Sealing Performance:

In some instances, as where a very long pipe overlap is not practical, other enhancements can be made to the heat shrink system to improve sealing performance. The object is to prevent water from penetrating the spigot-socket interface, thereby preventing leakage and preventing separation due to pressure penetration. There are many enhancements which might be employed, including:

Gaskets between layers; the simplest approach, probably most cost effective and probably the best way to prevent leakage.

Applying an adhesive between layers; this would improve both sealing pressure and axial thrust performance. Adhesives could include such things as epoxy, polyurethane, heat activated and such things as double sided sticking tape.

Another approach is socket thickening; this would increase the pressure at which heat shrink interference is overcome by expansion.

A further approach would be the use of an external socket reinforcement; this would increase the pressure at which heat shrink interference is overcome by expansion.

Figure 10:
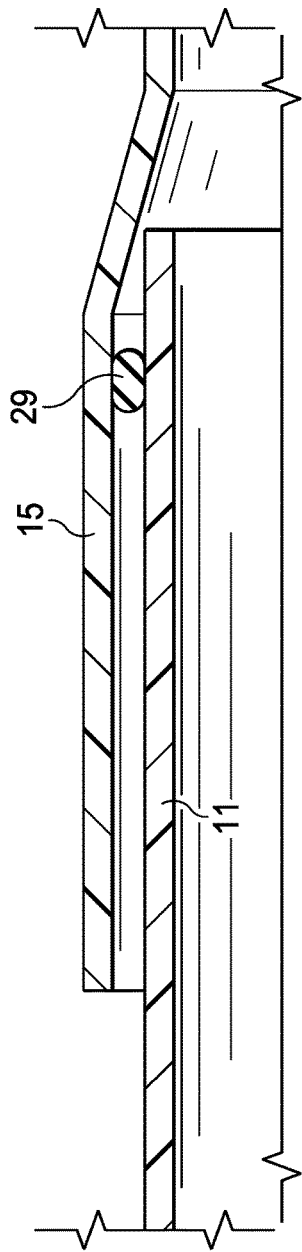
FIGS. 10-12 are simplified, partly schematic quarter sectional views of the pipe joint of molecularly oriented pipe illustrating the use of an annular sealing gasket to prevent separation of the pipe sections and loss of sealing capacity.
Figure 11:
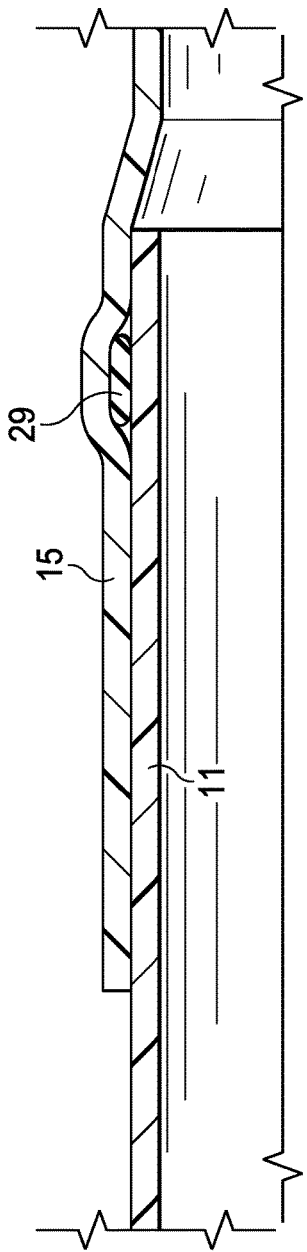
Figure 12:
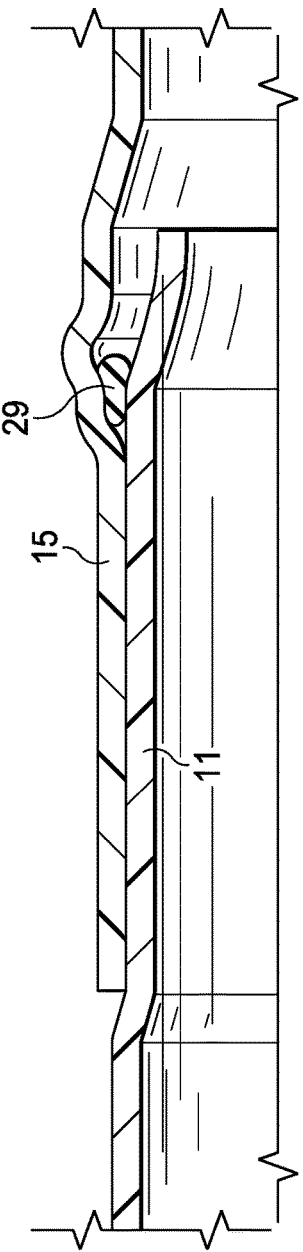

FIGS. 10-12 illustrate the use of a gasket to prevent separation. FIG. 10 illustrates, in simplified fashion, the condition of the joint prior to heating. The preferred seal ring or gasket 29 would be flat so that it wouldn't tend to roll. FIG. 11 shows the condition of the joint after heating with the seal ring 29 being confined and compressed between the spigot 11 and socket 15. FIG. 12 illustrates the joint condition at the pressure at which the difference in expansion between the overlapped and non-overlapped pipe is greater than the interference fit. The socket and spigot start separating. However, the seal ring 29 blocks pressure penetration and stops the separation process. The integrity of the overlap on the dry side of the joint prevents seal extrusion and preserves joint restraint.

Figure 13:
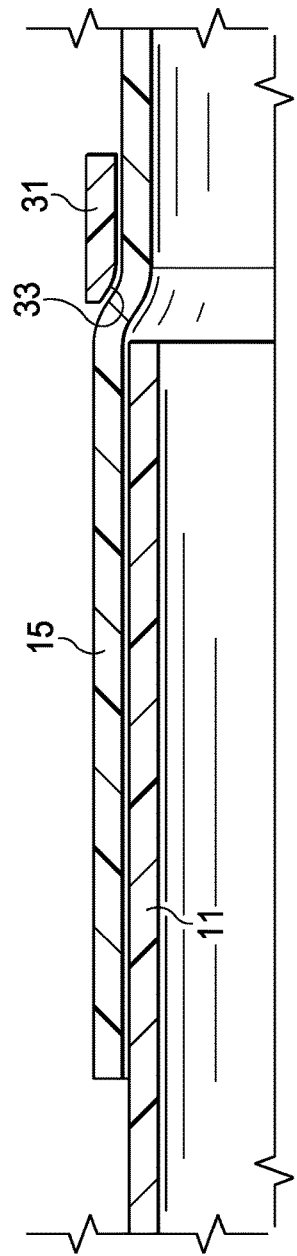
FIGS. 13-15 are views similar to FIGS. 10-12 but shoving the use of an external reinforcement element as a method for preventing separation of the pipe joint.
Figure 14:
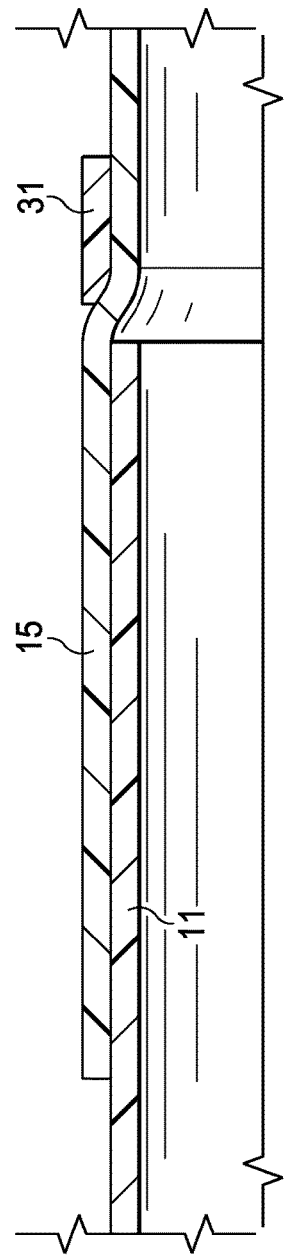

FIGS. 13-14 illustrate, in simplified fashion, the use of an external reinforcement on the socket 15. The reinforcement 31 is, in this case, a piece of the same pipe material as the remainder of the pipe joint at the socket O.D. It can be shrunk at the plant or in the field. An optional chamfer 33 can be provided over the socket transition to improve fit. It could also be another type of reinforcement, such as a strap.

Figure 15:
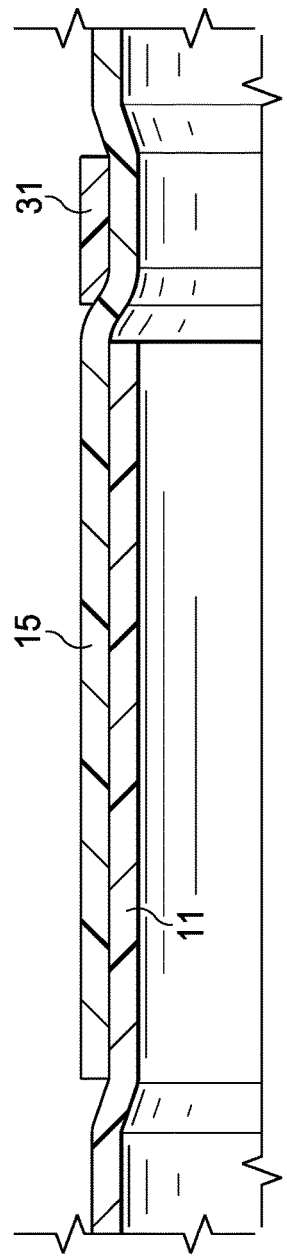

FIG. 14 shows the condition of the joint after shrinking. FIG. 15 shows what happens when pressure is applied. The reinforcement 31 prevents the socket 15 from expanding at the point of pressure penetration. However, there is still some risk of pressure penetration if the mating surfaces are not smooth enough.

Figure 16:
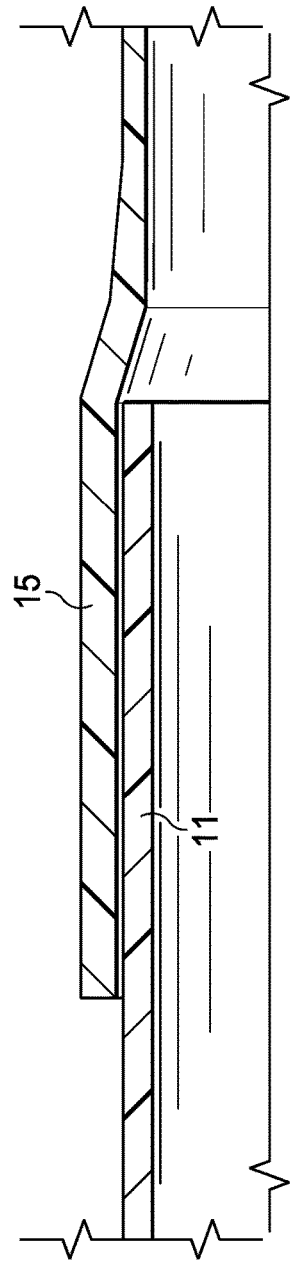
FIGS. 16-18 are similar to FIGS. 13-15, but show the use of a thickened socket end as a method of preventing pressure penetration between the spigot end and socket end of the pipe joint.
Figure 17:
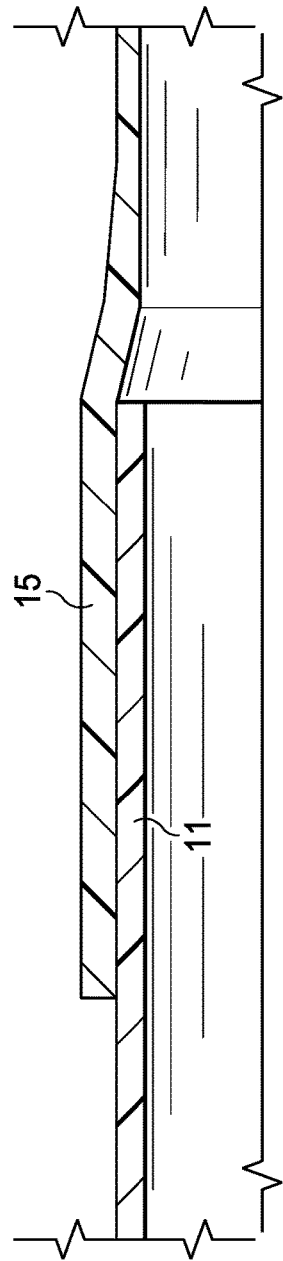
Figure 18:
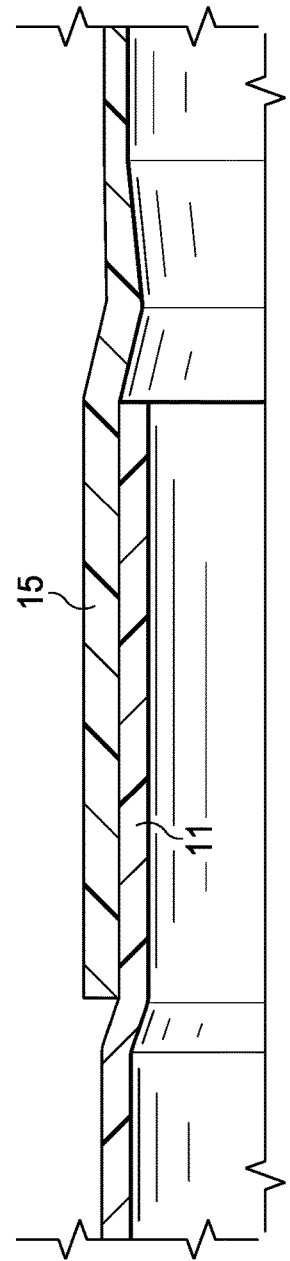

FIGS. 16-18 are intended to illustrate the use of a thickened socket (bell) to enhance sealing performance. FIG. 16 shows the condition of the joint before shrinking. However, a thicker socket will be more difficult to produce and shrink. FIG. 17 shows the condition of the joint after shrinking. When pressure is applied, the thick socket expands less to the pressure at which pressure penetration occurs will increase. There is still a risk of pressure penetration if the mating surfaces are not smooth enough.

Enhancements to Axial Restraint:

As mentioned briefly, there are also various enhancements to axial restraint that can be utilized. One is to increase the coefficient of friction of the spigot. This would improve the resistance to axial thrust. The coefficient of friction could be increased, for example, by forming "bumps" in spigot, or by machining ridges, providing knurled surfaces, or sanded surfaces on the spigot.

Another technique would be to provide a mechanical grip between spigot OD & socket ID layers. This would improve sealing pressure and axial thrust properties of the joint. The mechanical grip might comprise, for example, a metallic and rubber sleeve composite, or a simple wire mesh sleeve.

FIG. 19 shows the pipe joint equipped with a sealing ring 35 and a mechanical gipping element 37 before shrinking. It is possible that the seal element and the gripping element might be integrated into a single part for easier handling. Possible variations in seal shape can lead to an optimized socket profile and improved sealing performance. The sealing element shown in FIGS. 19 and 20 is a "barbell" shaped profile.

FIG. 20 shows the joint after shrinking. The particular type of gripping element shown in FIGS. 19 and 20 is a portion of an expanded wire mesh sleeve. The wire mesh sleeve has sharp edges for indentation of the spigot and can be supplied in a variety of shapes and thicknesses.

An invention has been shown with several advantages. The heat shrinking method of the invention provides a simple and economical way to join PVC-O pipe, as well as providing a restrained joint for PVC-O pipe. The approach avoids many of the problems involved in belling PVC-O pipe in order to provide an internal groove or raceway for a sealing gasket, or in attempting to use a Rieber type belling process. The method is simpler and more economical than using an external coupling or external restraints. The technique does not necessarily rely upon the indentation of PVC-O which is hard and brittle by nature. The present method differs from prior heat shrinking techniques for plastic pipe which involved the use of a separate sleeve where the sleeve constituted a separate, distinct part, which never became a structurally integral part of the pipe, and thus became a point of weakness.

While the invention has been shown in several of its forms, it is not thus limited bat is susceptible to various changes and modifications without departing from the spirit thereof.

What is claimed is:

1. A method for joining a first longitudinal section of non-corrugated molecularly oriented pipe to a second longitudinal section of non-corrugated molecularly oriented pipe to form a restrained joint between the first and second sections of molecularly oriented pipe, each of the longitudinal sections of molecularly oriented pipe being used in a municipal water or sewer line and having at least one plain, spigot end having a given external diameter and a mating socket end having a given internal diameter which presents an end opening having enough clearance to allow the plain spigot end of the first longitudinal section of molecularly oriented pipe to be inserted into the end opening of the mating socket end of the second longitudinal section of molecularly oriented pipe, the method comprising the steps of:

inserting the plain spigot end of the first section of molecularly oriented pipe into the end opening of the mating socket end of the second longitudinal section of molecularly oriented pipe to a preselected depth;

heating the mating socket end of the second longitudinal section of molecularly oriented pipe to about 80° C. so that the internal diameter of the mating socket end of the second longitudinal section of molecularly oriented pipe comes into contact with the external diameter of the plain spigot end of the first longitudinal section of molecularly oriented pipe, the second longitudinal section of molecularly oriented pipe being in a rubbery state after heating which allows the mating socket end of the second longitudinal section of molecularly oriented pipe to conform tightly to the external diameter of the plain spigot end of the first longitudinal section of molecularly oriented pipe without deforming the plain spigot end of the first longitudinal section of molecularly oriented pipe; and cooling the mating socket end of the second longitudinal section of molecularly oriented pipe to about 55° C., whereby the mating socket end of the second longitudinal section of molecularly oriented pipe undergoes thermal contraction to produce about an 0.5% interference fit with the plain spigot end of the first longitudinal section of molecularly oriented pipe, the interference fit resulting from the thermal contraction serving as the main source of restraint for the restrained joint.

2. The method of claim 1, wherein the restrained joint between the plain spigot end of the first longitudinal section of molecularly oriented pipe and mating socket end of the second longitudinal section of molecularly oriented pipe resulting from the thermal contraction and interference fit is enhanced by increasing the coefficient of friction of the plain spigot end of the first longitudinal section of molecularly oriented pipe prior to assembly of the restrained joint.

3. The method of claim 2, wherein the coefficient of friction of the plain spigot end of the first longitudinal section of molecularly oriented pipe is increased by a technique selected from the group consisting of forming bumps in the external diameter of the plain spigot end of the first longitudinal section of molecularly oriented pipe and machining ridges, providing knurled surfaces and providing sanded surfaces on the plain spigot end of the first longitudinal section of molecularly oriented pipe.

4. The method of claim 1, wherein the method for joining a first longitudinal section of molecularly oriented pipe to a second longitudinal section of molecularly oriented pipe includes a heat shrinking technology selected from the group consisting of an open flame, an oven, a pressure chamber over a selected area of the pipe joint being formed and a plug run inside a selected area of the joint being formed.

\* \* \* \* \*